US012492293B2

(12) United States Patent
Weinert et al.

(10) Patent No.: US 12,492,293 B2
(45) Date of Patent: Dec. 9, 2025

(54) MULTI-COMPONENT SYSTEMS FOR PREPARING FOAMED PRODUCTS

(71) Applicant: Arkema France, Colombes (FR)

(72) Inventors: Zackariah J. Weinert, King of Prussia, PA (US); Jon Scholte, King of Prussia, PA (US); Michael A. Bailey, King of Prussia, PA (US); Mahendra C. Orilall, King of Prussia, PA (US)

(73) Assignee: Arkema France, Puteaux (FR)

( * ) Notice: Subject to any disclaimer, the term of this patent is extended or adjusted under 35 U.S.C. 154(b) by 958 days.

(21) Appl. No.: 17/299,352

(22) PCT Filed: Dec. 2, 2019

(86) PCT No.: PCT/IB2019/001372
§ 371 (c)(1),
(2) Date: Jun. 3, 2021

(87) PCT Pub. No.: WO2020/115560
PCT Pub. Date: Jun. 11, 2020

(65) Prior Publication Data
US 2022/0033606 A1    Feb. 3, 2022

Related U.S. Application Data

(60) Provisional application No. 62/774,894, filed on Dec. 4, 2018.

(51) Int. Cl.
*C08J 9/14*    (2006.01)
*C08J 9/00*    (2006.01)
*C08L 81/02*   (2006.01)

(52) U.S. Cl.
CPC .............. *C08J 9/141* (2013.01); *C08J 9/0061* (2013.01); *C08L 81/02* (2013.01); *C08J 2203/14* (2013.01); *C08J 2381/02* (2013.01); *C08J 2483/04* (2013.01)

(58) Field of Classification Search
CPC ......... C08G 75/045; C08J 9/0061; C08J 9/12; C08J 9/141; C08J 2201/026; C08J 2203/14; C08J 2381/02; C08J 2483/04; C08L 81/02
See application file for complete search history.

(56) References Cited

U.S. PATENT DOCUMENTS

| 9,359,471 | B2 | 6/2016 | Trumbo et al. |
| 10,513,575 | B2 | 12/2019 | Hasegawa et al. |
| 10,995,219 | B2 | 5/2021 | Bailey et al. |
| 2016/0096942 | A1 | 4/2016 | Speer |
| 2018/0258201 | A1 | 9/2018 | Turunc et al. |

FOREIGN PATENT DOCUMENTS

| CN | 102639579 | A | * | 8/2012 | ........... C04B 22/068 |
| CN | 108473680 | A | * | 8/2018 | ............. C08F 20/38 |
| EP | 2993200 | A1 | | 3/2016 | |
| JP | 2013189540 | A2 | | 3/2012 | |
| TW | 201307077 | A | | 2/2013 | |
| TW | 201835197 | A | | 10/2018 | |
| WO | WO9640528 | | | 12/1996 | |
| WO | WO2011064360 | A1 | | 6/2011 | |
| WO | WO2014070973 | A1 | | 5/2014 | |
| WO | WO16076209 | A1 | | 11/2015 | |
| WO | WO2017036525 | A1 | | 3/2017 | |
| WO | WO2017157711 | A1 | | 9/2017 | |

\* cited by examiner

*Primary Examiner* — John M Cooney
(74) *Attorney, Agent, or Firm* — Christopher R. Lewis

(57) ABSTRACT

Foamed products are produced using multi-component systems which are advantageously free of isocyanate. The components of the systems are combined, with the resulting mixture then undergoing curing and foaming to provide a foamed product, wherein the characteristics of the foamed product may be varied by selecting particular reactants to be present in the multi-component system. The systems employ at least one (meth)acrylate compound having two or more (meth)acrylate functional groups per molecule, at least one thiol compound having two or more thiol functional groups per molecule, at least one free radical initiator, at least one blowing agent, at least one surfactant, and optionally at least one promoter for the free radical initiator.

17 Claims, No Drawings

MULTI-COMPONENT SYSTEMS FOR PREPARING FOAMED PRODUCTS

CROSS-REFERENCE TO RELATED APPLICATIONS

This application is a U.S. national stage application under 35 U.S.C. § 371 of international application number PCT/IB2019/001372, filed Dec. 2, 2019, which claims priority to U.S. patent application No. 62/774,894, filed Dec. 4, 2018.

FIELD OF THE INVENTION

The present invention relates to isocyanate-free systems comprising multiple components wherein, when the components are combined, foaming and curing of the mixed components take place to provide a foamed product.

BACKGROUND OF THE INVENTION

Polyurethane foams have been widely used for many years. Such foams are typically synthesized using approximately stoichiometric amounts of isocyanate-containing monomers and polyols. The most common isocyanate monomers are methylene diphenyl diisocyanate (MDI) and toluene diisocyanate (TDI). For both of these chemicals, low-level chronic exposure poses hazards such as damage to the respiratory system, sensitization, asthma symptoms, and the increased likelihood of both birth defects and cancer. Low-level chronic exposure is unavoidable for certain workers making and using polyurethane foams.

Proper handling of these chemicals can prevent incidents of acute exposure. However, the consequences are very high when mistakes or accidents occur. Acute exposure to MDI is toxic to the respiratory system, and while MDI is unforgiving, acute exposure to TDI is even more damaging. A single inhalation exposure to TDI is toxic to the respiratory system and is fatal.

In 2017, the California Department of Toxic Substances Control began requiring that spray foam manufactures report in detail the chemical alternatives to isocyanates. This information is expected to be used to draft new legislation. The foam industry believes that in the near future California will introduce a ban on the use of MDI and TDI in spray foams.

The hazards of isocyanates extend beyond the jobsite. The potential harm to society includes upstream risks during production, transportation, and storage. Downstream, there are concerns about residual isocyanate in consumer products, including spray foam home insulation. Collectively, polyurethane technology poses significant isocyanate exposure risk during production, plant handling and storage, transportation from plant to customer, customer handling and storage, customer use, distribution, and to the final consumer of the foam. A recent event in India is an example of this broader harm, where four people were killed and thirteen injured from accidental exposure at a TDI plant.

Despite these significant health and safety risks, polyurethane foam is recognized as being extremely useful because of its ability to provide a diversity of foam material properties across many applications. The challenge of solving the widespread health concerns of polyurethane foams centers on the development of isocyanate-free alternative foam technology that offers a comparable breadth of material properties.

Various technologies for the preparation of foamed products which avoid the use of isocyanate-containing reactants are already known.

For example, European Patent Application EP 2993200 A1 describes a polymeric foam precursor composition comprising the components (a) a di- or trifunctional (meth)acrylate oligomer; (b) a di- or higher-functional thiol compound; and (c) a borane compound as initiator. Relatively high amounts of thiol compound are employed, which is disadvantageous due to the sulfurous and objectionable odor such compounds typically have.

WO 2014/070973 A1 discloses thiol acrylate nanocomposite foams which are based on copolymers synthesized by reacting an alkyne or acrylate monomer with a nitrogenous compound to convert a portion of the monomer into a tertiary amine and to obtain a mixture of unreacted monomer and the tertiary amine, then reacting the mixture with a thiol having at least two thiol groups.

Despite these above-mentioned developments, a need remains for new isocyanate-free foam technologies that can provide the foam industry with systems that are capable of being used in much the same way as conventional polyurethane foam systems and that can provide thermoset foams having a comparable range of material properties suitable for diverse end-use applications.

SUMMARY OF THE INVENTION

The present invention, according to certain embodiments, provides multi-component systems for preparing foamed products. The individual formulated components of the system are generally stable and thus can be stored for extended periods of time without significant reaction or deterioration. When the components are combined, however, reaction and foaming of the mixed components take place, typically within a few minutes even at room temperature, to form a stable foamed product, without the need to apply external stimuli such as light or heat. The reactants present in the individual components may be varied as may be desired in order to achieve particular material properties in the foamed product that is produced, thus offering a versatility comparable to what is achievable in conventional polyurethane foam technology, but without the use of isocyanates.

In a first embodiment, the multi-component system comprises, consists essentially of or consists of:
  a first component comprised of at least one (meth)acrylate compound having two or more (meth)acrylate functional groups per molecule; and
  a second component comprised of at least one thiol compound having two or more thiol functional groups per molecule.

At least one free radical initiator is present in at least one of the first component or the second component, at least one surfactant is present in at least one of the first component or the second component, and at least one blowing agent is present in at least one of the first component or the second component. Furthermore, in the event the multi-component system has a molar ratio of thiol functional groups to (meth)acrylate functional groups of 0.5:1 or greater and the at least one free radical initiator includes at least one organic peroxide, the multi-component system additionally comprises at least one promoter for the at least one organic peroxide, wherein the at least one organic peroxide and the at least one promoter for the at least organic peroxide are present in different components (in particular, the promoter is present in the first component and the organic peroxide is present in the second component).

In a second embodiment, the multi-component system comprises, consists essentially of or consists of:
- a first component comprised of at least one (meth)acrylate compound having two or more (meth)acrylate functional groups per molecule, at least one thiol compound having two or more thiol functional groups per molecule, at least one promoter, and at least one stabilizer; and a second component comprised of at least one free radical initiator;
- wherein the at least one promoter is a promoter for the at least one free radical initiator, at least one surfactant is present in at least one of the first component or the second component, and at least one blowing agent is present in at least one of the first component or the second component.

The invention also provides a foamed product, wherein the foamed product is a foamed and cured reaction product of one of the above-mentioned multi-component systems.

In other embodiments of the invention, methods of making a foamed product are provided. Such methods comprise a step of combining the first component and the second component of the multi-component systems as described above.

DETAILED DESCRIPTION OF CERTAIN EMBODIMENTS OF THE INVENTION

The foamed products in accordance with the invention can be flexible (rubbery) or rigid (hard) foams and may be foams comprised of open cells, closed cells or both open cells and closed cells, depending upon the particular materials used to formulate the multi-component system for the foamed product.

The multi-component systems employed to prepare the foamed products include one or more substances from each of the following groups: (meth)acrylate compounds (containing two or more (meth)acrylate functional groups per molecule), thiol compounds (containing two or more thiol functional groups per molecule), blowing agents, surfactants and free radical initiators, as will be explained in more detail subsequently. One or more promoters for the free radical initiator(s), may also be present. Optional additional ingredients of the formulation include, for example, (meth) acrylate compounds containing a single (meth)acrylate functional group per molecule, stabilizers, pigments/dyes, adhesion promoters, fillers, and other additives. These ingredients are separated into at least two components, wherein each component preferably is stable at room temperature (25° C.) for a defined period of time (e.g., at least two weeks, at least one month, at least three months or at least six months). The term "stable", as used herein, means that each ingredient of the component exhibits less than 10%, or preferably less than 5%, change in its chemical composition over the defined period of time. Preferably, each component of the multi-component system is liquid at 25° C., subject to the understanding that the components may contain individual ingredients that are in liquid, gas or solid form.

It is not outside the scope of the invention to separate substances within the aforementioned groups between different components of the multi-component system. Additionally, it may be beneficial for each of the components to contain the same substance. However, care should be taken to segregate substances which are reactive towards each other or unstable in each other's presence (for example, if a promoter for the free radical initiator is used, it generally will be preferred for all of the promoter to be present in one component and all of the free radical initiator to be present in the other component).

One illustrative way to formulate the multi-component system is to have a first component contain the (meth) acrylate compound(s) and promoter(s), with a second component containing the thiol compound(s), surfactant(s), free radical initiator(s) and blowing agent(s). Other variations will be apparent based on the following detailed description of the invention.

In view of the following description, a formulator will be capable of deciding which substances to include in each component and to decide on the identity and amount of each substance based on the specifics of the target end-use application motivating the formulation work. Among other information, the formulator may consider the desired stabilities of the separate components, target formulation physical properties (e.g., the viscosity of each component and the viscosity of the mixture initially formed by combining the components), the desired relative volumes of the separate components, the processability of the individual substances, the processability of the formulation (i.e., the processability of each component and the mixture formed by combining the components), the target reactivity of the components when combined (e.g., the time required to attain a satisfactory degree of cure in the foamed product), the intended application of the multi-component system, the target properties of the resulting foamed product (e.g., foam density, toughness, flexibility, strength, cell structure, insulative properties, etc.), and the specific foamed product application.

The viscosities of the mixtures initially obtained by mixing of the components in accordance with the present invention may be selected and adjusted to be similar to that of conventional two-component polyurethane foam systems which are known and used in the art, to permit existing two-component polyurethane foam equipment and processing and application techniques to be utilized. For example, in certain embodiments of the invention, the first and second components when initially combined may form a mixture which has a viscosity at 25° C. of 50 cps to 10,000 cps.

(Meth)Acrylate Compounds

The multi-component systems of the present invention include at least one (meth)acrylate compound having two or more (meth)acrylate functional groups per molecule, although the multi-component systems may additionally contain one or more (meth)acrylate compounds having just one (meth)acrylate functional group per molecule. As used herein, the term (meth)acrylate includes both acrylate and methacrylate. Preferably, the first component comprises at least one acrylate compound having two or more acrylate functional groups per molecule. Suitable (meth)acrylate compounds include both (meth)acrylate monomers and (meth)acrylate oligomers. For example, the first component may comprise one or more (meth)acrylate monomers, but no (meth)acrylate oligomer. In other embodiments, the first component may comprise at least one (meth)acrylate monomer and at least one (meth)acrylate oligomer. It may also be possible to formulate the first component such that it comprises one or more (meth)acrylate oligomers, but no (meth) acrylate monomer.

Specifically, compounds having two or more acrylate and/or methacrylate polymerizable functional groups per molecule and useful in the first component of the multi-component system include both (meth)acrylate monomers and oligomers.

Examples of useful (meth)acrylate monomers containing two or more (meth)acrylate functional groups per molecule include acrylate and methacrylate esters of polyhydric alcohols (organic compounds containing two or more, e.g., 2 to 6, hydroxyl groups per molecule). Specific examples of suitable polyhydric alcohols include $C_{2-20}$ alkylene glycols (glycols having a $C_{2-10}$ alkylene group may be preferred, in which the carbon chain may be branched; e.g., ethylene glycol, trimethylene glycol, 1,2-propylene glycol, 1,2-butanediol, 1,3-butanediol, 2,3-butanediol, tetramethylene glycol (1,4-butanediol), 1,5-pentanediol, 1,6-hexanediol, 1,8-octanediol, 1,9-nonanediol, 1,12-dodecanediol, cyclohexane-1,4-dimethanol, bisphenols, and hydrogenated bisphenols, as well as alkoxylated (e.g., ethoxylated and/or propoxylated) derivatives thereof, wherein for example from 1 to 20 moles of an alkylene oxide such as ethylene oxide and/or propylene oxide has been reacted with 1 mole of glycol), diethylene glycol, glycerin, alkoxylated glycerin, triethylene glycol, dipropylene glycol, tripropylene glycol, trimethylolpropane, alkoxylated trimethylolpropane, ditrimethylolpropane, alkoxylated ditrimethylolpropane, pentaerythritol, alkoxylated pentaerythritol, dipentaerythritol, alkoxylated dipentaerythritol, cyclohexanediol, alkoxylated cyclohexanediol, cyclohexanedimethanol, alkoxylated cyclohexanedimethanol, norbornene dimethanol, alkoxylated norbornene dimethanol, norbornane dimethanol, alkoxylated norbornane dimethanol, polyols containing an aromatic ring, cyclohexane-1,4-dimethanol ethylene oxide adducts, bis-phenol ethylene oxide adducts, hydrogenated bisphenol ethylene oxide adducts, bisphenol propylene oxide adducts, hydrogenated bisphenol propylene oxide adducts, cyclohexane-1,4-dimethanol propylene oxide adducts, sugar alcohols and alkoxylated sugar alcohols. Such polyhydric alcohols may be fully or partially esterified (with (meth)acrylic acid, (meth)acrylic anhydride, (meth) acryloyl chloride or the like), provided they contain at least two (meth)acrylate functional groups per molecule. As used herein, the term "alkoxylated" refers to compounds in which one or more epoxides such as ethylene oxide and/or propylene oxide have been reacted with active hydrogen-containing groups (e.g., hydroxyl groups) of a base compound, such as a polyhydric alcohol, to form one or more oxyalkylene moieties. For example, from 1 to 25 moles of epoxide may be reacted per mole of base compound. According to certain aspects of the invention, the (meth) acrylate monomer(s) used may be relatively low in molecular weight (e.g., not more than 1000 daltons, such as 100 to 1000 daltons).

Any of the (meth)acrylate-functionalized oligomers known in the art may also be used in the present invention, provided such oligomers contain two or more (meth)acrylate functional groups per molecule. The number average molecular weight of such oligomers may vary widely, e.g., from about 100 to about 2500 or from about 100 to about 750 daltons. According to certain embodiments, as the number average molecular weight of the oligomer is increased, it may be preferred to increase the average functionality of the oligomer (i.e., to increase the average number of (meth)acrylate functional groups per molecule of the oligomer) to 3, 4 or higher. As used herein, the term "number average molecular weight" refers, in the case of a discrete individual compound to the calculated molecular weight of that compound based on its known structure, or, in the case of a mixture of compounds (as may be commonly present in oligomeric (meth)acrylates), to the number average molecular weight as determined by gel permeation chromatography using polystyrene calibration standards.

Suitable free (meth)acrylate oligomers include, for example, polyester (meth)acrylate oligomers, epoxy (meth) acrylate oligomers, polyether (meth)acrylate oligomers, polyurethane (meth)acrylate oligomers, acrylic (meth)acrylate oligomers, polydiene (meth)acrylate oligomers, polycarbonate (meth)acrylate oligomers and combinations thereof. Such oligomers may be selected and used in combination with one or more (meth)acrylate-functionalized monomers in order to enhance the flexibility, strength and/or modulus, among other attributes, of a cured resin foam prepared using the multi-component system of the present invention.

Exemplary polyester (meth)acrylate oligomers include the reaction products of acrylic or methacrylic acid or mixtures thereof with hydroxyl group-terminated polyester polyols. The reaction process may be conducted such that all or essentially all of the hydroxyl groups of the polyester polyol have been (meth)acrylated, particularly in cases where the polyester polyol is difunctional. The polyester polyols can be made by polycondensation reactions of polyhydroxyl functional components (in particular, diols) and polycarboxylic acid functional compounds (in particular, dicarboxylic acids and anhydrides). The polyhydroxyl functional and polycarboxylic acid functional components can each have linear, branched, cycloaliphatic or aromatic structures and can be used individually or as mixtures.

Examples of suitable epoxy (meth)acrylate oligomers include the reaction products of acrylic or methacrylic acid or mixtures thereof with glycidyl ethers or esters.

Suitable polyether (meth)acrylate oligomers include, but are not limited to, the condensation reaction products of acrylic or methacrylic acid or mixtures thereof with polyetherols which are polyether polyols (such as polyethylene glycol, polypropylene glycol or polytetramethylene glycol). Suitable polyetherols can be linear or branched substances containing ether bonds and terminal hydroxyl groups. Polyetherols can be prepared by ring opening polymerization of cyclic ethers such as tetrahydrofuran or alkylene oxides with a starter molecule. Suitable starter molecules include water, polyhydroxyl functional materials, polyester polyols and amines.

Polyurethane (meth)acrylate oligomers (sometimes also referred to as "urethane (meth)acrylate oligomers") capable of being used in the multi-component systems of the present invention include urethanes based on aliphatic and/or aromatic polyester polyols and polyether polyols and aliphatic and/or aromatic polyester diisocyanates and polyether diisocyanates capped with (meth)acrylate end-groups. Suitable polyurethane (meth)acrylate oligomers include, for example, aliphatic polyester-based urethane di- and tetra-acrylate oligomers, aliphatic polyether-based urethane di- and tetra-acrylate oligomers, as well as aliphatic polyester/polyether-based urethane di- and tetra-acrylate oligomers.

In various embodiments, the polyurethane (meth)acrylate oligomers may be prepared by reacting aliphatic and/or aromatic diisocyanates with OH group terminated polyester polyols (including aromatic, aliphatic and mixed aliphatic/aromatic polyester polyols), polyether polyols, polycarbonate polyols, polycaprolactone polyols, polydimethysiloxane polyols, or polybutadiene polyols, or combinations thereof to form isocyanate-functionalized oligomers which are then reacted with hydroxyl-functionalized (meth)acrylates such as hydroxyethyl acrylate or hydroxyethyl methacrylate to provide terminal (meth)acrylate groups. For example, the polyurethane (meth)acrylate oligomers may contain two, three, four or more (meth)acrylate functional groups per molecule.

Suitable acrylic (meth)acrylate oligomers (sometimes also referred to in the art as "acrylic oligomers") include oligomers which may be described as substances having an oligomeric acrylic backbone which is functionalized with one or (meth)acrylate groups (which may be at a terminus of the oligomer or pendant to the acrylic backbone). The acrylic backbone may be a homopolymer, random copolymer or block copolymer comprised of repeating units of acrylic monomers. The acrylic monomers may be any monomeric (meth)acrylate such as C1-C6 alkyl (meth)acrylates as well as functionalized (meth)acrylates such as (meth)acrylates bearing hydroxyl, carboxylic acid and/or epoxy groups. Acrylic (meth)acrylate oligomers may be prepared using any procedures known in the art such as oligomerizing monomers, at least a portion of which are functionalized with hydroxyl, carboxylic acid and/or epoxy groups (e.g., hydroxyalkyl(meth)acrylates, (meth)acrylic acid, glycidyl (meth)acrylate) to obtain a functionalized oligomer intermediate, which is then reacted with one or more (meth)acrylate-containing reactants to introduce the desired (meth)acrylate functional groups.

Exemplary (meth)acrylate monomers and oligomers may include ethoxylated bisphenol A di(meth)acrylates; triethylene glycol di(meth)acrylate; ethylene glycol di(meth)acrylate; tetraethylene glycol di(meth)acrylate; polyethylene glycol di(meth)acrylates; 1,4-butanediol diacrylate; 1,4-butanediol dimethacrylate; diethylene glycol diacrylate; diethylene glycol dimethacrylate; 1,6-hexanediol diacrylate; 1,6-hexanediol dimethacrylate; neopentyl glycol diacrylate; neopentyl glycol di(meth)acrylate; polyethylene glycol (600) dimethacrylate (where 600 refers to the approximate number average molecular weight of the polyethylene glycol portion); polyethylene glycol (200) diacrylate; 1,12-dodecanediol dimethacrylate; tetraethylene glycol diacrylate; triethylene glycol diacrylate; 1,3-butylene glycol dimethacrylate; tripropylene glycol diacrylate; polybutadiene diacrylate; methyl pentanediol diacrylate; polyethylene glycol (400) diacrylate; ethoxylated$_2$ bisphenol A dimethacrylate; ethoxylated$_3$ bisphenol A dimethacrylate; ethoxylated$_3$ bisphenol A diacrylate; cyclohexane dimethanol dimethacrylate; cyclohexane dimethanol diacrylate; ethoxylated$_{10}$ bisphenol A dimethacrylate (where the numeral following "ethoxylated" is the average number of oxyalkylene moieties per molecule); dipropylene glycol diacrylate; ethoxylated$_4$ bisphenol A dimethacrylate; ethoxylated$_6$ bisphenol A dimethacrylate; ethoxylated$_8$ bisphenol A dimethacrylate; alkoxylated hexanediol diacrylates; alkoxylated cyclohexane dimethanol diacrylate; dodecane diacrylate; ethoxylated$_4$ bisphenol A diacrylate; ethoxylated$_{10}$ bisphenol A diacrylate; polyethylene glycol (400) dimethacrylate; polypropylene glycol (400) dimethacrylate; metallic diacrylates; modified metallic diacrylates; metallic dimethacrylates; polyethylene glycol (1000) dimethacrylate; methacrylated polybutadiene; propoxylated$_2$ neopentyl glycol diacrylate; ethoxylated$_{30}$ bisphenol A dimethacrylate; ethoxylated$_{30}$ bisphenol A diacrylate; alkoxylated neopentyl glycol diacrylates; polyethylene glycol dimethacrylates; 1,3-butylene glycol diacrylate; ethoxylated$_2$ bisphenol A dimethacrylate; dipropylene glycol diacrylate; ethoxylated$_4$ bisphenol A diacrylate; polyethylene glycol (600) diacrylate; polyethylene glycol (1000) dimethacrylate; tricyclodecane dimethanol diacrylate; propoxylated$_2$ neopentyl glycol diacrylate; diacrylates of alkoxylated aliphatic alcohols trimethylolpropane trimethacrylate; trimethylolpropane triacrylate; tris (2-hydroxyethyl) isocyanurate triacrylate; ethoxylated$_{20}$ trimethylolpropane triacrylate; pentaerythritol triacrylate; ethoxylated$_3$ trimethylolpropane triacrylate; propoxylated$_3$ trimethylolpropane triacrylate; ethoxylated$_6$ trimethylolpropane triacrylate; propoxylated$_6$ trimethylolpropane triacrylate; ethoxylated$_9$ trimethylolpropane triacrylate; alkoxylated trifunctional acrylate esters; trifunctional methacrylate esters; trifunctional acrylate esters; propoxylated$_3$ glyceryl triacrylate; propoxylated$_{5.5}$ glyceryl triacrylate; ethoxylated$_{15}$ trimethylolpropane triacrylate; trifunctional phosphoric acid esters; trifunctional acrylic acid esters; pentaerythritol tetraacrylate; di-trimethylolpropane tetraacrylate; ethoxylated$_4$ pentaerythritol tetraacrylate; pentaerythritol polyoxyethylene tetraacrylate; dipentaerythritol pentaacrylate; pentaacrylate esters; epoxy acrylate oligomers; epoxy methacrylate oligomers; urethane acrylate oligomers; urethane methacrylate oligomers; polyester acrylate oligomers; polyester methacrylate oligomers; stearyl methacrylate oligomer; acrylic acrylate oligomers; perfluorinated acrylate oligomers; perfluorinated methacrylate oligomers; amino acrylate oligomers; amine-modified polyether acrylate oligomers; and amino methacrylate oligomers.

Particularly preferred (meth)acrylate compounds having two or more (meth)acrylate functional groups per molecule include dipropylene glycol diacrylate and tricyclodecane dimethanol diacrylate.

Thiol Compounds

The multi-component systems of the present invention also include at least one thiol compound having two or more thiol functional groups (i.e., —SH groups) per molecule (sometimes also referred to herein as a "polythiol"). According to one preferred embodiment, the at least one thiol compound comprises, consists essentially of or consists of at least one thiol compound having two or more aliphatic thiol functional groups per molecule. As used herein, the term "aliphatic thiol" refers to a thiol group which is directly attached to an aliphatic carbon atom. The thiol functional groups, according to preferred embodiments of the invention, may be primary thiol groups and/or secondary thiol groups. The multiple thiol groups present on a single thiol compound may be the same as, or different from, each other (e.g., the multiple thiol groups may be all primary thiol groups, all secondary thiol groups, or a combination of primary and secondary thiol groups). Suitable thiol compounds for use in the present invention may contain two, three, four, five, six or more thiol groups per molecule, for example.

According to preferred embodiments of the invention, a thiol compound is employed which is a 2-mercaptoacetate, 3-mercaptopropionate or 3-mercaptobutyrate ester of an alcohol, in particular a polyalcohol containing two or more hydroxyl groups per molecule such as a glycol; trimethylolpropane; pentaerythritol; or the like.

In other preferred embodiments, a polythiol of an oligomeric polyether is used, such as an oligomer of ethylene glycol in which the terminal hydroxyl groups are replaced by thiol groups. Such compounds may correspond to the general formula HS(R—O)$_n$R—SH, wherein n is an integer of at least 1 (e.g., 1-10) and each R is the same or different and is an alkylene moiety such as ethylene, propylene, tetramethylene, or the like. 1,8-Dimercapto-3,6-dioxaoctane is a specific example of this type of thiol compound.

Polythiols of the type described in U.S. Pat. Publication Nos. 2012/0035291 and 2018/0297943 and PCT Publication WO 2018/146415, the entire disclosures of which are incorporated by reference for all purposes, may also be used as the thiol compound in the present invention.

Examples of suitable thiol compounds include:
(a) thiol compounds which include a hydrocarbon structure functionalized with two or more thiol groups (e.g., aliphatic thiol compounds such as $C_{2-20}$ alkane polythiols, aromatic aliphatic polythiols such as xylylene dithiol, polythiols obtained by substituting a halogen atom in a halohydrin adduct of an alcohol with a mercapto group, and polythiol compounds including a reaction product of a polyepoxide compound with hydrogen sulfide);

(b) polythiol compounds which include an ether structure represented by formula (I):

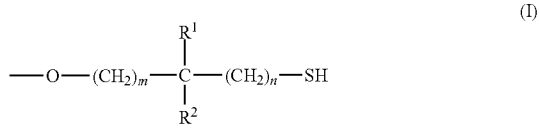

(I)

wherein $R^1$ and $R^2$ are independently hydrogen atom or a $C_{1-10}$ alkyl group; m is 0, 1 or 2; and n is 0 or 1; and (c) polythiol compounds which, in addition to two or more thiol groups, include at least one ester structure represented by formula (II):

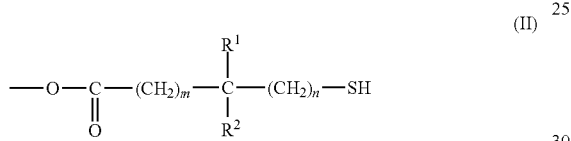

(II)

wherein $R^1$, $R^2$, m and n are as defined above.

Illustrative examples of polythiol compounds of type (a) include 2,5-hexanedithiol, 2,9-decanedithiol and 1,4-bis(1-mercaptoethyl)benzene.

Examples of polythiol compounds of type (b), which include an ether structure, include compounds having a structure such as a 2-mercaptoethyl ether group, a 2-mercaptopropyl ether group, a 3-mercaptopropyl ether group, a 2-mercaptobutyl ether group, a 3-mercaptobutyl ether group, a 4-mercaptobutyl ether group, a 5-mercaptopentyl ether group or a 5-mercaptohexyl ether group.

Examples of polythiol compounds of type (c), which include an ester structure, include compounds produced by esterifying a carboxylic acid containing a mercapto group, which is a compound in which hydrogen atom is bound to the left terminal of the structure of formula (II), with a polyhydric alcohol.

Specific examples of carboxylic acids containing a mercapto group, which are compounds in which a hydrogen atom is bound to the left terminal of the structure of formula (II), include thioglycolic acid, 2-mercaptopropionic acid, 3-mercaptobutyric acid, 2-mercaptoisobutyric acid, 3-mercaptoisobutyric acid, 3-mercaptopropionic acid, 3-mercapto-3-phenylpropionic acid and 3-mercapto-3-methylbutyric acid. Among these compounds, 3-mercaptobutyric acid, 3-mercapto-3-phenylpropionic acid, 3-mercapto-3-methylbutyric acid and the like are preferred, and 3-mercaptobutyric acid and the like are more preferred.

Specific examples of suitable polyhydric alcohols include $C_{2-20}$ alkylene glycols (glycols having a C2-10 alkylene group may be preferred, in which the carbon chain may be branched; e.g., ethylene glycol, trimethylene glycol, 1,2-propylene glycol, 1,2-butanediol, 1,3-butanediol, 2,3-butanediol, tetramethylene glycol, 1,5-pentanediol, 1,6-hexanediol, 1,8-octanediol, 1,9-nonanediol, 1,12-dodecanediol, cyclohexane-1,4-dimethanol and hydrogenated bisphenol-A), diethylene glycol, poly(oxyalkylene)glycols, glycerin, triethylene glycol, polyethylene glycols, dipropylene glycol, tripropylene glycol, polypropylene glycols, polytetramethylene ether glycols, trimethylolpropane, ditrimethylolpropane, pentaerythritol, dipentaerythritol, cyclohexanediol, cyclohexanedimethanol, norbornene dimethanol, norbornane dimethanol, polycarbonate diols, polysilicones modified with a hydroxy group at each end, polyols containing an aromatic ring, tris-2-hydroxyethyl isocyanurate, 2,2-bis[4-(2-hydroxyethyloxy)phenyl]propane, 4,4'-(9-fluorenylidene)bis(2-phenoxyethanol), cyclohexane-1,4-dimethanol ethylene oxide adducts, hydrogenated bisphenol-A ethylene oxide adducts, cyclohexane-1,4-dimethanolpropylene oxide adducts, and hydrogenated bisphenol-A propylene oxide adducts.

Examples of suitable polythiol compounds include polythiol compounds represented by formula (III) or formula (IV):

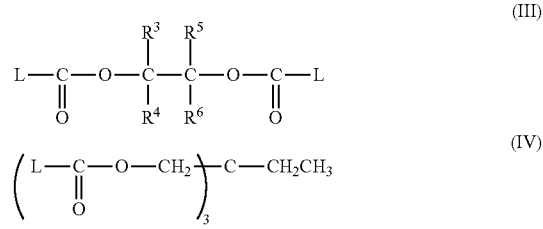

(III)

(IV)

wherein $R^3$ to $R^6$ are independently a hydrogen atom or a $C_{1-10}$ alkyl group (e.g., a linear or branched $C_{1-3}$ alkyl group, such as a methyl group, ethyl group, n-propyl group or isopropyl group) and L-C(=O)-O— is a structure of formula (II).

Specific examples of suitable polythiol compounds include: phthalic acid di(1-mercaptoethyl ester); phthalic acid di(2-mercaptopropyl ester); phthalic acid di(3-mercaptobutyl ester); phthalic acid di(3-mercaptoisobutyl ester); ethylene glycol bis(3-mercaptobutyrate), propylene glycol bis(3-mercaptobutyrate); diethylene glycol bis(3-mercaptobutyrate); butanediol bis(3-mercaptobutyrate); octanediol bis(3-mercaptobutyrate); trimethylolpropane tris(3-mercaptobutyrate); pentaerythritol tetrakis(3-mercaptobutyrate); dipentaerythritol hexakis(3-mercaptobutyrate); 1,3-butanediol bis(3-mercaptobutyrate); 1,4-butanediol bis(3-mercaptobutyrate); neopentyl glycol bis(3-mercaptobutyrate); 1,6-hexanediol bis(3-mercaptobutyrate); 1,8-octanediol bis(3-mercaptobutyrate); 1,9-nonanediol bis(3-mercaptobutyrate); cyclohexane-1,4-dimethanol bis(3-mercaptobutyrate); diethylene glycol bis(3-mercaptobutyrate); triethylene glycol bis(3-mercaptobutyrate); polyethylene glycol bis(3-mercaptobutyrate), dipropylene glycol bis(3-mercaptobutyrate), tripropylene glycol bis(3-mercaptobutyrate), polypropylene glycol bis(3-mercaptobutyrate), polytetramethylene ether glycol bis(3-mercaptobutyrate), bis(3-mercaptobutyrate) of a cyclohexane-1,4-dimethanol ethylene oxide adduct, bis(3-mercaptobutyrate) of a hydrogenated bisphenol-A ethylene oxide adduct, bis(3-mercaptobutyrate) of a cyclohexane-1,4-dimethanol propylene oxide adduct, bis(3-mercaptobutyrate) of a hydrogenated bisphenol-A propylene oxide adduct, glycerol tris(3-mercaptobutyrate), diglycerol tetrakis(3-mercaptobutyrate), trimethylolpropane tris(3-mercaptobutyrate), ditrimethylolpropane tetrakis(3-mercaptobutyrate), pentaerythritol tetrakis(3-mercaptobutyrate), dipentaerythritol hexakis(3-mercaptobutyrate), ethylene glycol bis(2-mercaptopropionate), propylene glycol bis(2-mercaptopropionate), diethylene glycol bis(2-mercaptopropionate), butanediol bis(2-mercaptopropionate), octanediol bis(2-mercaptopropionate), trimethylolpropane tris(2-mercaptopropionate), pentaerythritol tetrakis(2-mercaptopropionate), dipentaerythritol hexakis(2-mercaptopropionate), ethylene glycol bis(3-mercaptoisobutyrate), propylene glycol bis(3-mercaptoisobutyrate), diethylene glycol bis(3-mercaptoisobutyrate), butanediol bis(3-mercaptoisobutyrate), octanediol bis(3-mercaptoisobutyrate), trimethylolpropane tris(3-mercaptoisobutyrate), pentaerythritol tetrakis(3-mercaptoisobutyrate), dipentaerythritol hexakis(3-mercaptoisobutyrate), ethylene glycol bis(2-mercaptoisobutyrate), propylene glycol bis(2-mercaptoisobutyrate), diethylene glycol bis(2-mercaptoisobutyrate), butanediol bis(2-mercaptoisobutyrate), octanediol bis(2-mercaptoisobutyrate), trimethylolpropane tris(2-mercaptoisobutyrate), pentaerythritol tetrakis(2-mercaptoisobutyrate), dipentaerythritol hexakis(2-mercaptoisobutyrate), ethylene glycol bis(4-mercaptovalerate); propylene glycol bis(4-mercaptoisovalerate); diethylene glycol bis(4-mercaptovalerate); butanediol bis(4-mercaptovalerate); octanediol bis(4-mercaptovalerate); trimethylolpropane tris(4-mercaptovalerate); pentaerythritol tetrakis(4-mercaptovalerate); dipentaerythritol hexakis(4-mercaptovalerate); ethylene glycol bis(3-mercaptovalerate); propylene glycol bis(3-mercaptovalerate); diethylene glycol bis(3-mercaptovalerate), butanediol bis(3-mercaptovalerate); octanediol bis(3-mercaptovalerate); trimethylolpropane tris(3-mercaptovalerate); pentaerythritol tetrakis(3-mercaptovalerate); dipentaerythritol hexakis(3-mercaptovalerate); hydrogenated bisphenol-A bis(3-mercaptobutyrate); bisphenol-A dihydroxyethyl ether-3-mercaptobutyrate; 4,4'-(9-fluorenylidene)bis(2-phenoxyethyl (3-mercaptobutyrate)); ethylene glycol bis(3-mercapto-3-phenylpropionate); propylene glycol bis(3-mercapto-3-phenylpropionate); diethyl ene glycol bis(3-mercapto-3-phenylpropionate); butanediolbis(3-mercapto-3-phenylpropionate); octanediol bis(3-mercapto-3-phenylpropionate); trimethylolpropane tris(3-mercapto-3-phenylpropionate); tris-2-(3-mercapto-3-phenylpropionate) ethyl isocyanurate; pentaerythritol tetrakis(3-mercapto-3-phenylpropionate); dipentaerythritol hexakis(3-mercapto-3-phenylpropionate); ethylene glycol bis(thioglycolate); trimethylene glycol bis(thioglycolate), propylene glycol bis (thioglycolate); 1,3-butanediol bis(thioglycolate); 1,4-butanediol bis(thioglycolate); neopentyl glycol bis(thioglycolate); 1,6-hexanediol bis(thioglycolate); 1,8-octanediol bis (thioglycolate); 1,9-nonanediol bis(thioglycolate); cyclohexane-1,4-dimethanol bis(thioglycolate); diethylene glycol bis(thioglycolate); triethylene glycol bis(thioglycolate); polyethylene glycol bis(thioglycolate); dipropylene glycol bis(thioglycolate); tripropylene glycol bis(thioglycolate); polypropylene glycol bis(thioglycolate); polytetramethylene ether glycol bis(thioglycolate); a bis(thioglycolate) of a cyclohexane-1,4-dimethanol ethylene oxide adduct; a bis(thioglycolate) of a hydrogenated bisphenol-A ethylene oxide adduct; a bis(thioglycolate) of a cyclohexane-1,4-dimethanol propylene oxide adduct; a bis(thioglycolate) of a hydrogenated bisphenol-A propylene oxide adduct; glycerol tris(thioglycolate); diglycerol tetrakis(thioglycolate); trimethylolpropane tris(thioglycolate); ditrimethylolpropane tetrakis(thioglycolate); pentaerythritol tetrakis(thioglycolate); dipentaerythritol hexakis(thioglycolate); ethylene glycol bis (3-mercaptopropionate); trimethylene glycol bis(3-mercaptopropionate); propylene glycol bis(3-mercaptopropionate); 1,3-butanediol bis(3-mercaptopropionate); 1,4-butanediol bis(3-mercaptopropionate); neopentyl glycol bis(3-mercaptopropionate); 1,6-hexanediol bis(3-mercaptopropionate); 1,8-octanediol bis(3-mercaptopropionate); 1,9-nonanediol bis(3-mercaptopropionate); cyclohexane-1,4-dimethanol bis(3-mercaptopropionate); diethylene glycol bis(3-mercaptopropionate); triethylene glycol bis(3-mercaptopropionate); polyethylene glycol bis(3-mercaptopropionate); dipropylene glycol bis(3-mercaptopropionate); tripropylene glycol bis(3-mercaptopropionate); polypropylene glycol bis(3-mercaptopropionate); polytetramethylene ether glycol bis(3-mercaptopropionate); a bis(3-mercaptopropionate) of a cyclohexane-1,4-dimethanol ethylene oxide adduct, a bis(3-mercaptopropionate) of a hydrogenated bisphenol-A ethylene oxide adduct, a bis(3-mercaptopropionate) of a cyclohexane-1,4-dimethanol propylene oxide adduct, a bis(3-mercaptopropionate) of a hydrogenated bisphenol-A propylene oxide adduct, glycerol tris(3-mercaptopropionate); diglycerol tetrakis(3-mercaptopropionate); trimethylolpropane tris(3-mercaptopropionate); ditrimethylolpropane tetrakis(3-mercaptopropionate); pentaerythritol tetrakis(3-mercaptopropionate); 1,8-dimercapto-3,6-dioxaoctane; and dipentaerythritol hexakis(3-mercaptopropionate).

Combinations of two or more different thiol compounds may be utilized in the second component.

(Meth)Acrylate Compounds Having a Single (Meth)Acrylate Functional Group Per Molecule The multi-component systems of the present invention may optionally comprise one or more (meth)acrylate compounds containing a single acrylate or methacrylate functional group per molecule (referred to herein as "mono (meth)acrylate-functionalized compounds"). Any of such compounds known in the art may be used. Typically, the mono(meth)actylate-functionalized compound(s), if used, will be present in the same component as the (meth)acrylate comnpound(s) having two or more (meth)acrylate functional groups per molecule.

Examples of suitable mono(meth)acrylate-functionalized compounds include, but are not limited to, mono-(meth) acrylate esters of aliphatic alcohols (wherein the aliphatic alcohol may be straight chain, branched or alicyclic and may be a mono-alcohol, a di-alcohol or a polyalcohol, provided only one hydroxyl group is esterified with (meth)acrylic acid); mono-(meth)acrylate esters of aromatic alcohols (such as phenols, including alkylated phenols); mono-(meth) acrylate esters of alkylaryl alcohols (such as benzyl alcohol); mono-(meth)acrylate esters of oligomeric and polymeric glycols such as diethylene glycol, triethylene glycol, dipropylene glycol, tripropylene glycol, polyethylene glycol, and polypropylene glycol); mono-(meth)acrylate esters of monoalkyl ethers of glycols, oligomeric glycols, polymeric glycols; mono-(meth)acrylate esters of alkoxylated (e.g., ethoxylated and/or propoxylated) aliphatic alcohols (wherein the aliphatic alcohol may be straight chain, branched or alicyclic and may be a mono-alcohol, a di-alcohol or a polyalcohol, provided only one hydroxyl group of the alkoxylated aliphatic alcohol is esterified with (meth) acrylic acid); mono-(meth)acrylate esters of alkoxylated (e.g., ethoxylated and/or propoxylated) aromatic alcohols (such as alkoxylated phenols); caprolactone mono(meth) acrylates; and the like.

The following compounds are specific examples of mono (meth)acrylate-functionalized compounds suitable for use in the multi-component systems of the present invention: methyl (meth)acrylate; ethyl (meth)acrylate; n-propyl (meth)acrylate; n-butyl (meth)acrylate; isobutyl (meth)acrylate; n-hexyl (meth)acrylate; 2-ethylhexyl (meth)acrylate; n-octyl (meth)acrylate; isooctyl (meth)acrylate; n-decyl (meth)acrylate; n-dodecyl (meth)acrylate; tridecyl (meth) acrylate; tetradecyl (meth)acrylate; hexadecyl (meth)acrylate; 2-hydroxyethyl (meth)acrylate; 2- and 3-hydroxypropyl (meth)acrylate; 2-methoxyethyl (meth)acrylate; 2-ethoxyethyl (meth)acrylate; 2- and 3-ethoxypropyl (meth) acrylate; tetrahydrofurfuryl (meth)acrylate; alkoxylated tetrahydrofurfuryl (meth)acrylate; isobornyl (meth)acrylate; 2-(2-ethoxyethoxy)ethyl (meth)acrylate; cyclohexyl (meth) acrylate; glycidyl (meth)acrylate; isodecyl (meth)acrylate: 2-phenoxyethyl (meth)acrylate: lauryl (meth)acrylate; isobornyl (meth)acrylate; 2-phenoxyethyl (meth)acrylate; alkoxylated phenol (meth)acrylates; alkoxylated nonylphenol (meth)acrylates; cyclic trimethylolpropane formal (meth)acrylate; trimethylcyclohexanol (meth)acrylate; diethylene glycol monomethyl ether (meth)acrylate; diethylene glycol monoethyl ether (meth)acrylate; diethylene glycol monobutyl ether (meth)acrylate; triethylene glycol monoethyl ether (meth)acrylate; ethoxylated lauryl (meth) acrylate; methoxy polyethylene glycol (meth)acrylates; and combinations thereof.

According to certain embodiments of the invention, the composition does not contain any mono(meth)acrylate-functionalized compound (i.e., compounds containing only a single acrylate or methacrylate functional group per molecule). However, the composition may comprise one or more mono(meth)acrylate-functionalized compounds. According to certain embodiments, the amount of mono (meth)acrylate-functionalized compound relative to the amount of (meth)acrylate compound having two or more (meth)acrylate functional groups per molecule is limited. For example, the at least one multi(meth)acrylate-functionalized compound containing two or more (meth)acrylate functional groups per molecule may be present in an amount effective to satisfy the following equation:

$$A/[A+B]>0.4$$

wherein A=total amount by weight of (meth)acrylate compound containing two or more (meth)acrylate functional groups per molecule and B=total amount by weight mono (meth)acrylate-functionalized compound containing a single (meth)acrylate functional group per molecule. According to other embodiments of the invention, $A/[A+B]>0.5$, $A/[A+B]>0.6$, $A/[A+B]>0.7$, $A/[A+B]>0.8$, $A/[A+B]>0.9$, $A/[A+B]>0.95$.

Ratio of Thiol Compound to (Meth)Acrylate Compound

The relative amounts of thiol compound(s) and (meth) acrylate compound(s) in the multi-component system of the present invention may be varied as appropriate in view of the properties and characteristics that may be desired for the multi-component system and/or the foamed product obtained therefrom.

In certain embodiments of the invention, the amount of thiol compound employed is low relative to the amount of (meth)acrylate compound. For example, the multi-component system may have a molar ratio of thiol functional groups to (meth)acrylate functional groups of less than 0.5:1, 0.4:1 or less, 0.35:1 or less, 0.3:1 or less, or 0.25 or less. Using a relatively low molar amount of thiol compound is advantageous in that thiol compounds typically are more costly than (meth)acrylate compounds and also often have an unpleasant odor.

However, in other embodiments, higher molar amounts of thiol compound employed relative to the molar amount of (meth)acrylate compound may be present. For example, the multi-component system may have a molar ratio of thiol functional groups to (meth)acrylate functional groups of 0.5:1 or greater, e.g. 0.55:1 or greater, 0.6:1 or greater, or 0.7:1 or greater. Typically, however, it is generally preferred for the molar ratio of thiol functional groups to be not greater than 1:1, e.g., not greater than 0.95:1, not greater than 0.9:1, not greater than 0.85:1, or not greater than 0.8:1.

According to preferred embodiments, the multi-component system has a molar ratio of thiol functional groups to (meth)acrylate functional groups of at least 0.01:1, at least 0.05:1, or at least 0.1:1.

In embodiments where the multi-component system has a molar ratio of thiol functional groups to (meth)acrylate functional groups of 0.5:1 or greater and the at least one free radical initiator includes at least one organic peroxide, the multi-component system additionally comprises at least one promoter for the at least one organic peroxide, wherein the at least one organic peroxide and the at least one promoter for the at least one organic peroxide are present in different components (in particular, the promoter is present in the first component and the organic peroxide is present in the second component). Such organic peroxide and promoter for the organic peroxide may optionally also be present in the multi-component system when the molar ratio of thiol functional groups to (meth)acrylate functional groups is less than 0.5:1.

Free Radical Initiators

Free radical initiators suitable for use in the present invention include any substance capable of initiating the free radical polymerization (curing) of the (meth)acrylate compound(s). According to one embodiment, a free radical initiator is employed which is stable at room temperature (25° C.), but is activated by heating to an elevated temperature (i.e., the free radical initiator is thermally activated). According to another embodiment, the free radical initiator is, by itself or as formulated into a component in accordance with the present invention, stable at room temperature, but is activated by being combined with one or more promoters which facilitate the generation of free radical species capable of initiating polymerization. Such activation using a promoter advantageously occurs at room temperature (e.g., 15° C. to 30° C.). A combination of promoter(s) and heating may be used to activate the free radical initiator, in certain embodiments of the invention.

Suitable free radical initiators include, for example, azo initiators, organic peroxides (including dialkyl peroxides, alkylaryl peroxides and diacyl peroxides), hydroperoxides, perketals, peresters, peroxydicarbonates, and peracids. Specific illustrative examples of free radical initiators suitable for use in the present invention include di-t-butyl azodiisobutyronitrile (AIBN), benzoyl peroxide, cumene hydroperoxide, methyl ethyl ketone peroxide, and t-butyl hydroperoxide.

The multi-component system of the present invention should be formulated to contain an amount of free radical initiator (or combination of free radical initiators) effective to achieve curing of the components, once combined, within a predetermined period of time (which desirably will be within 60 minutes, within 45 minutes, within 30 minutes or within 15 minutes from the time the components are mixed, according to various embodiments of the invention).

Typically, free radical initiator is present in the multi-component system in a total amount of from 0.05 to 2% by weight based on the total weight of the multi-component system.

According to certain embodiments, the multi-component systems of the present invention do not contain any Michael addition catalysts.

Promoters for Free Radical Initiators One or more promoters for the free radical initiator may be present in the multi-component systems of the present invention. If present, it is preferred that such promoter(s) be present in a component other than the component containing free radical initiator, to prevent premature activation of the free radical initiator. Such substances catalyze, promote or activate the decomposition of one or more of the free radical initiators present in the multi-component systems when the components are combined, thereby accelerating the curing of the multi-component system by the free radical initiator(s).

Suitable promoters include, for example, metallic species such as metal salts, in particular salts of metals selected from the group consisting of Li, Al, Mg, Co, Fe, Cu, Zn, Ni, Mn, Cr, Sn, Au, Pd, V and Pt. The anionic portion of the salt may be a halide, nitrate, sulfate or carboxylate (e.g., lactate, acetate, hexanoate, naphthenate), for example. Halide salts, in particular chloride salts, are especially preferred. Complexes of the aforementioned metals may also be used.

Typically, the multi-component system will comprise an amount of promoter effective to reduce the cure time of the multi-component system (once mixed) as compared to the cure time observed in the absence of promoter. Such an amount will vary depending upon a number of factors, but in various embodiments of the invention promoter is present in an amount which provides at least 5, 10, 20, 30, 40 or 50 ppm in total of the metal(s) selected from the group consisting of Li, Al, Mg, Co, Fe, Cu, Zn, Ni, Mn, Cr, Sn, Au, Pd, V and Pt, based on the total weight of the multi-component system. In other embodiments, the multi-component system contains promoter(s) in an amount to provide not more than 5000, 3500 or 2000 ppm of such metal(s) in the multi-component system, based on the total weight of the multi-component system.

Surfactants

The multi-component systems of the present invention include one or more surfactants. The surfactant(s) may be part of the first component or the second component or may be present in both the first component and the second component. A surfactant or combination of surfactants may assist in or promote the stabilization of gas cells formed during the foaming of the multi-component system (e.g., by inhibiting the coalescence of bubbles), but may serve one or more other functions as well such as reducing surface tension, compatibilizing or dispersing the ingredients of a component, or compatilizing the components once combined.

The types of surfactants useful in the present invention are not particularly limited but non-ionic surfactants and in particular silicon-containing surfactants, such as silicone oils or siloxane oxyalkylene block copolymers, may advantageously be employed.

The preferred silicon-containing surfactants are non-hydrolyzable materials such as silicon-glycol copolymers. Examples of such surfactants may include but are not limited to TegoStab® B 8465, TegoStab® B 8484, TegoStab® B 8486, Momentive® L-5130, Momentive® L-5180, Momentive® L-5340, Momentive® L-5440, Momentive® L-6100, Momentive® L-6900, Momentive® L-6980, Momentive® L-6988, Air Products DC-193, Air Products DC-197, Air Products DC-5582, Air Products-5598, Goldschmidt® AG B-8408, Goldschmidt® AG B-8407, Goldschmidt® AG B-8409, Goldschmidt® AG B-8462, and others disclosed in U.S. Pat. Nos. 2,834,748; 2,917,480; and 4,147,847 (each of which is incorporated herein by reference in its entirety for all purposes), and mixtures thereof.

Exemplary non-silicon-containing surfactants useful in the present invention may include, but are not limited to, oxyethylated alkylphenols, oxyethylated fatty alcohols, paraffin oils, castor oil esters, ricinoleic acid esters, turkey red oil, groundnut oil, paraffins, and fatty alcohols, and Air Products' LK-443 surfactant and mixtures thereof. A mixture of any number of silicon-containing surfactants combined with a mixture of any number of non-silicon-containing surfactants may serve as the surfactant component of this invention.

Generally speaking, an amount of surfactant is included in the multi-component system which is effective to provide greater stability of the gas cells which are formed, due to the presence of the blowing agent(s), as the multi-component system reacts and foams to provide a foamed product. Typically, the multi-component system of the present invention contains at least 0.1%, or at least 0.3%, or at least 0.5% by weight of surfactant, in total, based on the total weight of the multi-component system, but not more than 15%, not more than 10% or not more than 5% by weight of surfactant, in total, based on the total weight of the multi-component system. For example, the multi-component system may be comprised of from 0.1 to 3% by weight surfactant, in total, based on the total weight of the multi-component system.

Blowing Agents

The multi-component systems of the present invention include one or more blowing agents. The blowing agent(s) may be part of the first component or the second component or may be present in both the first component and the second component. The blowing agent may be any chemical or substance that vaporizes as a result of the heat generated during curing (polymerization) of the multi-component system, that reacts or decomposes to form a gas during the curing, or that reacts or decomposes to form a chemical or substance that vaporizes during the curing. Blowing agents which are most useful in the context of the present invention are chemicals or substances that have boiling points at atmospheric pressure up to about 180° C. or that produce reaction or decomposition products having boiling points at atmospheric pressure below 180° C.

Both physical and chemical blowing agents or combinations thereof may be used in the present invention. Chemical blowing agents typically are capable of evolving gases, such as carbon dioxide or nitrogen, by chemical reaction or decomposition. Physical blowing agents are typically gases or volatile low boiling liquids that are added to the foam forming composition. In an embodiment of the present invention, the blowing agent in the multi-component system comprises one or more physical blowing agents selected from hydrofluorocarbons (HFCs), hydrochlorofluorocarbons (HCFCs), hydrofluoroolefins (HFOs), hydrochlorofluoroolefins (HCFOs), hydrochloroolefins (HCOs), linear alkanes, branched alkanes, cyclic alkanes, carbon dioxide, methyl formate, inert gases, atmospheric gases, alcohols (preferably C1 to C5 alcohols), aldehydes (preferably C1 to C4 aldehydes), ethers (preferably C1 to C4 ethers, such as dimethyl ether) and diethers, fluorinated ethers, unsaturated fluorinated ethers, ketones, fluoroketones, water, or mixtures thereof.

Exemplary hydrofluorocarbon blowing agents useful in the present invention include but are not limited to difluoromethane (HFC-32); 1-fluoroethane (HFC-161); 1,1-difluoroethane (HFC-152a); 1,2-difluoroethane (HFC-152); 1,1,1-trifluoroethane (HFC-143a); 1,1,2-trifluoroethane (HFC-143); 1,1,1,2-tetrafluoroethane (HFC-134a); 1,1,2,2-tetrafluoroethane (HFC-134); 1,1,1,2,2-pentafluoroethane (HFC-125); 1,1,1,3,3-pentafluoropropane (HFC-245fa); 1,1,2,2,3-pentafluoropropane (HFC-245ca); 1,1,1,2,3-pentafluoropropane (HFC-245eb); 1,1,1,3,3,3-hexafluoropropane (HFC-236fa); 1,1,1,2,3,3,3-heptafluoropropane (HFC-227ea); 1,1,1,3,3-pentafluorobutane (HFC-365mfc); 1,1,1,2,3,4,4,5,5,5-decafluoropropane (HFC-4310); or mixtures thereof. In a preferred embodiment of the present invention, the hydrofluorocarbon blowing agent comprises HFC-365mfc; HFC-245fa; HFC-152a; or mixtures there.

Exemplary hydrofluoroolefin (HFO) blowing agents useful in the present invention include but are not limited to pentafluoropropenes, such as 1,2,3,3,3-pentafluoropropene (HFO-1225ye); tetrafluoropropenes, such as 1,3,3,3-tetrafluoropropene (HFO-1234ze, E and Z isomers), 2,3,3,3-tetrafluoropropene (HFO-1234yf), and 1,2,3,3-tetrafluoropropene (HFO-1234ye); trifluoropropenes, such as 3,3,3-trifluoropropene (HFO-1243zf); tetrafluorobutenes, such as (HFO-1345); pentafluorobutene isomers, such as (HFO-1354); hexafluorobutene isomers, such as (HFO-1336); heptafluorobutene isomers, such as (HFO-1327); heptafluoropentene isomers, such as (HFO-1447); octafluoropentene isomers, such as (HFO-1438); and nonafluoropentene isomers, such as (HFO-1429). Preferably, the hydrofluoroolefin blowing agents contain 3, 4, 5, or 6 carbons. In another preferred embodiment of the present invention, the hydrofluoroolefin blowing agent is selected from 2,3,3,3-tetrafluoropropene (HFO-1234yf); 1,3,3,3-tetrafluoropropene (HFO-1234ze), particularly the trans-isomer; 1,1,1,4,4,4-hexafluoro-2-butene (HFO-1336mzz), particularly the cis-isomer; or mixtures thereof.

Exemplary hydrochlorofluoroolefin (HCFO) blowing agents useful in the present invention include but are not limited to 1-chloro-3,3,3-trifluoropropene (HCFO-1233zd) (E and Z isomers); 2-chloro-3,3,3-trifluoropropene (HCFO-1233xf); HCFO-1223; 1,2-dichloro-1,2-difluoroethene (E and Z isomers); 3,3-dichloro-3-fluoropropene, 2-chloro-1,1,1,4,4,4-hexafluorobutene-2 (E and Z isomers); and 2-chloro-1,1,1,3,4,4,4-heptafluorobutene-2 (E and Z isomers). An exemplary hydrochloroolefin blowing agent of the present invention is trans-1,2-dichloroethylene (TDCE).

Exemplary alkane blowing agents useful in the present invention include, but are not limited to, cyclopentane; pentane; isobutane; liquid propane gas (LPG); and the like and combinations thereof.

The amount of blowing agent in the multi-component system of the present invention may be varied as may be appropriate in order to achieve, for example, a particular desired density in the foamed product produced using the multi-component system. Generally speaking, blowing agent is present in an amount effective to achieve a cured product which is foamed, i.e., a product containing at least some cells. The cells formed as a result of the foaming caused by the blowing agent(s) may be closed cells, open cells, or a combination of open and closed cells. The density of the foamed product may be, for example, from 0.01 g/cm$^3$ to 0.80 g/cm$^3$. Typically, the multi-component system is formulated so that it contains from 1 to 25% by weight blowing agent in total, based on the total weight of the multi-component system. For example, the multi-component system may comprise from 5 to 20% by weight blowing agent, in total, based on the total weight of the multi-component system.

Stabilizers

The multi-component system of the present invention may comprise one or more stabilizers, which may be present in one or all of the components of the system. Suitable stabilizers include compounds and substances which function to prevent or reduce premature reaction or deterioration of the materials present in the component, thereby extending or improving the shelf life of the individual component. If one of the components contains both thiol compound and (meth)acrylate compound, it will be especially advantageous to include at least one stabilizer in the component since such thiol compound/(meth)acrylate compound blends tend to be unstable in the absence of stabilizer, depending upon their inherent reactivity towards each other.

Stabilizers suitable for stabilizing mixtures of thiol compounds and (meth)acrylate compounds are well known in the art and include, for example, phenolic compounds (including hindered phenolic compounds and alkenyl substituted phenolic compounds); phosphonic acid compounds; phosphite compounds; hydroquinones; hydroxylamine salts; dialkyl polysulfides; organic acids; and the like and combinations thereof. Specific examples of suitable stabilizers include, but are not limited to, pyrogallol, vinylphosphonic acid, phenylphosphonic acid, phosphorous acid, (12-phosphonododecyl)phosphonic acid, (3-bromopropyl)phosphonic acid, butylhydroxytoluene, methoxy hydroquinone, isoeugenol, alpha-tocopherol, 4-tert-butylcatechol, gallic acid, lauryl gallate, triphenyl phosphite, tris(2,4-di-tert)-butylphenyl)phosphite, N-nitroso-N-phenylhydroxylamine aluminum salt, and 4-methoxy-1-naphthol and combinations thereof.

A component of the multi-component system of the present invention may contain, for example, from 5 to 1000 ppm, in total, of stabilizer(s).

Other Optional Additives

The multi-component systems of the present invention may additionally comprise one or more further additives. Such further additive or additives may be present in the first component alone, the second component alone, or both the first component and the second component, provided they are compatible with the other ingredients present in such component(s).

Examples of optional additives which may be included in the multi-component system include, but are not limited to, fillers, flame retardants, pigments/dyes, impact modifiers, plasticizers, rheology control agents, adhesion promoters and the like and combinations thereof. In preferred embodiments of the invention, the multi-component system is formulated to be free of isocyanate.

Exemplary additives and fillers may include but are not limited to polymers (especially thermoplastic polymers) such as polyolefins (e.g., linear low density polyethylene, ultra low density polyethylene, low density polyethylene, high density polyethylene, any other type of polyethylene, polypropylene), polyvinyl acetate, ethyl vinyl acetate, polyvinyl butyrate, rubbers, thermoplastic urethanes, acrylic resins (e.g., polymers of alkyl acrylates, such as homopolymers of methyl methacrylate and copolymers of methyl methacrylate and one or more other (meth)acrylate monomers) and random terpolymers of ethylene, vinyl acetate and maleic anhydride (such as those sold by Arkema under the brand name "Orevac"); inorganic substances such as dry-fumed silicas, precipitated silicas, surface-modified silicas, clays, zeolites, and mineral powders; block copolymers, impact modifiers, and engineered polymers such as core-shell particles. Hollow plastic particles containing a volatile substance (such as those sold by Akzo Nobel under the brand name "Expancel") can be used to increase the degree of foam expansion.

Inorganic nanoparticles represent a preferred type of additive which can be used in the present invention. Nanoparticles can be added to the formulation to affect the final foam properties, such as thermal conductivity. In particular, the combined organic-inorganic makeup of the foamed product incorporating such inorganic nanoparticles can improve the insulating properties versus a comparable formulation without the added inorganic nanoparticles. Organic particles, including organic nanoparticles, may also be used.

Illustrative suitable adhesion promoters include acrylated acrylic acid esters, acrylated sulfuric acid esters, acrylated phosphoric acid esters, any other acrylated organic acid or acrylated inorganic acid, and organic monomers or oligomers of any functionality that swell the substrate surface. Pigments include any chemical or substance which provides visible color to the formulation or finished foamed product. These include conjugated organic molecules, inorganic compounds, and organometallic compounds. Dyes can also have photochromic, electrochromic, or mechanochromic properties, and can exhibit photoswitching or other responsive visual effects. Dyes can be fluorescent or phosphorescent, and can have color-switching properties with regard to these phenomena as well.

Methods of Making Foamed Products

A foamed product in accordance with the present invention is prepared by combining the components of the multi-component system as described herein. Each component typically is stored separately from the other component(s) until ready for use, for example in separate drums, totes, bulk containers, tanks or the like or in separate compartments of a mixing/dispensing device such as an aerosol can or the like, in accordance with any of the practices and procedures known or used in the art of multi-component polyurethane systems. The desired amounts of each component are mixed using any suitable procedure or apparatus. Preferably, the mixing is carried out in a manner effective to achieve a uniform or homogeneous mixture.

According to one embodiment of the invention, the components of the multi-component system are mixed at ambient temperatures (e.g., room temperature or approximately 10° C. to 40° C.) and the resulting mixture allowed to simply react and cure without application of external heat or other external stimulus (such as actinic radiation). Mixing may be accomplished by any means known in the art, including the techniques practiced in the field of multi-component polyurethane foams. Generally speaking it will be desirable to formulate the multi-component system such that the components undergo exothermic reaction when combined, which is sufficient to volatilize or activate the blowing agent(s) and cause foaming of the combined components while they cure. However, it is also possible to apply external heat to help accelerate or otherwise control the rate of foaming and curing. According to one embodiment, the foamed product is initially formed without application of external heat and then subjected to a post-foaming heat treatment (in a heated oven, for example).

The multi-component systems of the present invention thus may be employed to manufacture articles comprised of foamed product, wherein the foamed product is the foamed and cured reaction product obtained by mixing the first and second components. Such a method may comprise combining the first component and the second component of the multi-component system to obtain a mixture and then contacting the mixture with at least one substrate. Such contacting may involve applying the mixture to at least one substrate surface, for example by spraying, coating, extrusion or other such application method. The amounts of the first component and second component which are combined may be selected and varied so as to provide the desired concentrations and proportions of the individual ingredients of the mixture which is formed, which will affect the curing and foaming properties of the mixture and the foamed product obtained therefrom.

The mixture initially obtained by combining the components of the multi-component system, which typically is in liquid or semi-liquid form, may be introduced into a closed or defined space (such as a mold, a hollow cavity, spaced-apart walls or the like), such that as the mixed components react and foam they expand and at least partially fill the closed or defined space. Spray, extrusion and pour-in-place methods may all be utilized. The multi-component systems of the present invention are especially useful as "polymerized-in-place" foams.

Uses for Foamed Products

The foamed products obtained in accordance with the present invention are useful in any of the applications in which polyurethane foams have conventionally been used, such as insulation, sound and vibration dampening applications, caulks, adhesives, composites and the like. In particular, the foamed products may be utilized to provide articles such as packaging materials, seat cushions, sound insulation, thermal insulation, mattresses, pillows, appliance insulation, building insulation and spray foams.

Aspects of the Invention

Illustrative and non-limiting aspects of the present invention may be summarized as follows:

Aspect 1: A multi-component system for preparing a foamed product, comprising:
  a) a first component comprised of at least one (meth) acrylate compound having two or more (meth)acrylate functional groups per molecule; and
  b) a second component comprised of at least one thiol compound having two or more thiol functional groups per molecule;
wherein at least one free radical initiator is present in at least one of the first component or the second component, at least one surfactant is present in at least one of the first component or the second component, and at least one blowing agent is present in at least one of the first component or the second component;
wherein in the event the multi-component system has a molar ratio of thiol functional groups to (meth)acrylate functional groups of 0.5:1 or greater and the at least one free radical initiator includes at least one organic peroxide, the multi-component system additionally comprises at least one promoter for the at least one organic peroxide,
wherein the at least one free radical initiator and the at least one promoter for the at least one free radical initiator are present in different components.

Aspect 2: The multi-component system of Aspect 1, wherein the multi-component system 10 has a molar ratio of thiol functional groups to (meth)acrylate functional groups of 0.4:1 or less.

Aspect 3: The multi-component system of Aspect 2, wherein the multi-component system comprises at least one promoter for the at least one free radical initiator and the at least one free radical initiator and the at least one promoter for the at least one free radical initiator are present in different components.

Aspect 4: The multi-component system of any of Aspects 1 to 3, wherein the first component is comprised of at least one (meth)acrylate compound having two or more (meth) acrylate functional groups per molecule and a number average molecular weight of up to 1000 daltons.

Aspect 5: The multi-component system of any of Aspects 1 to 4, wherein the first component is comprised of at least one (meth)acrylate compound selected from the group consisting of dipropylene glycol diacrylate and tricyclodecane dimethanol diacrylate.

Aspect 6: The multi-component system of any of Aspects 1 to 5, wherein the second component is comprised of at least one thiol compound having two or more aliphatic thiol functional groups per molecule.

Aspect 7: The multi-component system of any of Aspects 1 to 6, wherein the second component is comprised of at least one thiol compound having three or more aliphatic thiol functional groups per molecule.

Aspect 8: The multi-component system of any of Aspects 1 to 7, wherein the second component is comprised of at least one thiol compound which is a 2-mercaptoacetate, 3-mercaptopropionate ester or 3-mercaptobuyrate ester of a polyalcohol containing two or more hydroxyl groups per molecule.

Aspect 9: The multi-component system of any of Aspects 1 to 8, wherein the at least one free radical initiator includes at least one free radical initiator selected from the group consisting of azo compounds, organic peroxides, hydroperoxides, perketals, peresters, peroxydicarbonates, and peracids.

Aspect 10: The multi-component system of any of Aspects 1 to 9, wherein the at least one surfactant includes at least one silicon-containing surfactant.

Aspect 11: The multi-component system of any of Aspects 1 to 10, wherein the at least one blowing agent includes at least one physical blowing agent.

Aspect 12: The multi-component system of any of Aspects 1 to 11, wherein the molar ratio of thiol functional groups to (meth)acrylate functional groups is less than 0.3:1.

Aspect 13: The multi-component system of any of Aspects 1 to 12, comprising a total of from 50 to 85 weight percent (meth)acrylate compound(s) based on the total weight of the multi-component system.

Aspect 14: The multi-component system of any of Aspects 1 to 13, comprising a total of from 5 to 20 weight percent thiol compound based on the total weight of the multi-component system.

Aspect 15: The multi-component system of any of Aspects 1 to 14, comprising a total of from 0.05 to 3 weight percent free radical initiator based on the total weight of the multi-component system.

Aspect 16: The multi-component system of any of Aspects 1 to 15, comprising a total of from 0.1 to 3 weight percent surfactant based on the total weight of the multi-component system.

Aspect 17: The multi-component system of any of Aspects 1 to 16, comprising a total of from 1 to 25 weight percent blowing agent based on the total weight of the multi-component system.

Aspect 18: A foamed product, wherein the foamed product is a foamed and cured reaction product of the multi-component system of any of Aspects 1 to 17.

Aspect 19: The foamed product of Aspect 18, wherein the foamed product is an open cell foam, a closed cell foam or a foam comprising both open cells and closed cells.

Aspect 20: A method of making a foamed product, comprising a step of combining:
a) a first component comprised of at least one (meth)acrylate compound having two or more (meth)acrylate functional groups per molecule; and
b) a second component comprised of at least one thiol compound having two or more thiol functional groups per molecule;
wherein at least one free radical initiator is present in at least one of the first component or the second component, at least one surfactant is present in at least one of the first component or the second component, and at least one blowing agent is present in at least one of the first component or the second component; and
wherein in the event the first component and the second component in combination have a molar ratio of thiol functional groups to (meth)acrylate functional groups of 0.5:1 or greater and the at least one free radical initiator includes at least one organic peroxide, the multi-component system additionally comprises at least one promoter for the at least one organic peroxide, with the at least one organic peroxide and the at least one promoter for the at least one organic peroxide present in different components.

Aspect 21: The method of Aspect 20, wherein the multi-component system foams and cures to form a foamed product upon mixing the first component and the second component at 25° C.

Aspect 22: A multi-component system for preparing a foamed product, comprising:
a) a first component comprised of at least one (meth)acrylate compound having two or more (meth)acrylate functional groups per molecule, at least one thiol compound having two or more thiol functional groups per molecule, at least one promoter, and at least one stabilizer; and
b) a second component comprised of at least one free radical initiator;
wherein the at least one promoter is a promoter for the at least one free radical initiator, at least one surfactant is present in at least one of the first component or the second component, and at least one blowing agent is present in at least one of the first component or the second component.

Aspect 23: The multi-component system of Aspect 22, wherein the multi-component system has a molar ratio of thiol functional groups to (meth)acrylate functional groups of 0.4:1 or less.

Aspect 24: The multi-component system of Aspect 22 or Aspect 23, wherein the first component is comprised of at least one (meth)acrylate compound having two or more (meth)acrylate functional groups per molecule and a number average molecular weight of up to 1000 daltons.

Aspect 25: The multi-component system of any of Aspects 22 to 24, wherein the first component is comprised of at least one (meth)acrylate compound selected from the group consisting of dipropylene glycol diacrylate and tricyclodecane dimethanol diacrylate.

Aspect 26: The multi-component system of any of Aspects 22 to 25, wherein the first component is comprised of at least one thiol compound having two or more aliphatic thiol functional groups per molecule.

Aspect 27: The multi-component system of any of Aspects 22 to 26, wherein the first component is comprised of at least one thiol compound having three or more aliphatic thiol functional groups per molecule.

Aspect 28: The multi-component system of any of Aspects 22 to 27, wherein the first component is comprised of at least one thiol compound which is a 2-mercaptoacetate, 3-mercaptopropionate ester or 3-mercaptobuyrate ester of a polyalcohol containing two or more hydroxyl groups per molecule.

Aspect 29: The multi-component system of any of Aspects 22 to 28, wherein the at least one free radical initiator includes at least one free radical initiator selected from the group consisting of azo compounds, organic peroxides, hydroperoxides, perketals, peresters, peroxydicarbonates, and peracids.

Aspect 30: The multi-component system of any of Aspects 22 to 29, wherein the at least one surfactant includes at least one silicon-containing surfactant.

Aspect 31: The multi-component system of any of Aspects 22 to 30, wherein the at least one blowing agent includes at least one physical blowing agent.

Aspect 32: The multi-component system of any of Aspects 22 to 31, wherein the molar ratio of thiol functional groups to (meth)acrylate functional groups is less than 0.3:1.

Aspect 33: The multi-component system of any of Aspects 22 to 32, comprising a total of from 50 to 85 weight percent (meth)acrylate compound(s) based on the total weight of the multi-component system.

Aspect 34: The multi-component system of any of Aspects 22 to 33, comprising a total of from 5 to 20 weight percent thiol compound based on the total weight of the multi-component system.

Aspect 35: The multi-component system of any of Aspects 22 to 34, comprising a total of from 0.05 to 3 weight percent free radical initiator based on the total weight of the multi-component system.

Aspect 36: The multi-component system of any of Aspects 22 to 35, comprising a total of from 0.1 to 3 weight percent surfactant based on the total weight of the multi-component system.

Aspect 37: The multi-component system of any of Aspects 22 to 36, comprising a total of from 1 to 25 weight percent blowing agent based on the total weight of the multi-component system.

Aspect 38: The multi-component system of any of Aspects 22 to 37, wherein the at least one promoter includes at least one promoter which is a salt or complex of a metal selected from the group consisting of Li, Al, Mg, Co, Fe, Cu, Zn, Ni, Mn, Cr, Sn, Au, Pd, V and Pt.

Aspect 39: The multi-component system of any of Aspects 22 to 38, wherein the at least one stabilizer includes at least one stabilizer selected from the group consisting of phenolic compounds; phosphonic acid compounds; phosphite compounds; hydroquinones; hydroxylamine salts; organic acids; dialkyl polysulfides and combinations thereof.

Aspect 40: A foamed product, wherein the foamed product is a foamed and cured reaction product of the multi-component system of any of Aspects 22 to 39.

Aspect 41: The foamed product of Aspect 40, wherein the foamed product is an open cell foam, a closed cell foam or a foam comprising both open cells and closed cells.

Aspect 42: A method of making a foamed product, comprising a step of combining:
a) a first component comprised of at least one (meth)acrylate compound having two or more (meth)acrylate functional groups per molecule, at least one thiol compound having two or more thiol functional groups per molecule, at least one promoter, and at least one stabilizer; and
b) a second component comprised of at least free radical initiator;
wherein the at least one promoter is a promoter for the at least one free radical initiator, at least one surfactant is present in at least one of the first component or the second component, and at least one blowing agent is present in at least one of the first component or the second component.

Aspect 43: The method of Aspect 42, wherein a mixture obtained by combining the first component and the second component foams and cures to form a foamed product upon combining the first component and the second component at 25° C.

Aspect 44: A method of making an article comprised of a foamed product, the method comprising combining the first component and the second component of the multi-component system of any of Aspects 1 to 17 or 22 to 39 to obtain a mixture and contacting the mixture with at least one substrate.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the multi-component systems, compositions obtained by combining the components of the multi-component systems, methods for making and using the multi-component systems and compositions, and foamed product prepared using the multi-component systems and compositions obtained therefrom. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

The following example describes the preparation of a foamed product from a two-component system in which a monomeric (meth)acrylate and a relatively low molar ratio of thiol to (meth)acrylate functional groups (0.167:1) are used.

The following ingredients were employed, in the amounts shown in Table 1:

SR833S=tricyclodecane dimethanol diacrylate, molecular weight 304 daltons (Sartomer)

12% Cobalt Hex-Cem®=cobalt bis(2-ethylhexanoate) (Borchers)

Thiocure® PETMP=pentaerythritol tetrakis(3-mercaptopropionate) (Bruno Bock)

TegoStab® B 8484=silicone surfactant (Evonik)

Luperox® DDM-9=methyl ethyl ketone peroxide (Arkema)

Components A and B were separately prepared. A small (3%) excess of Component B was used to compensate for the loss of material on the walls of the container in which Component B was prepared. Component B was then added by pouring into Component A and mixed by hand for 25 seconds. Immediately after this mixing step was completed, the Component A/Component B mixture reacted and expanded into a foamed product. The hard, brittle foam had a high rise height and a 6% closed-cell percentage.

TABLE 1

| Component | Ingredient | mmol of Functionality | mmol | % on Resin | % on Total |
|---|---|---|---|---|---|
| A | SR833S | 744 | 372 | 88.2 | 75.4 |
| A | 12% Cobalt Hex-Cem ® | — | — | 0.5 | 0.4 |
| B | Thiocure ® PETMP | 124 | 31 | 11.8 | 10.1 |
| B | TegoStab ® B 8484 | — | — | 1.0 | 0.9 |
| B | Luperox ® DDM-9 | — | — | 0.5 | 0.4 |
| B | Cyclopentane | — | — | 15.0 | 12.8 |

Example 2

The following example describes the preparation of a foamed product from a two-component system in which a combination of a monomeric (meth)acrylate and an oligomeric (meth)acrylate (to provide a higher viscosity system than Example 1) and a higher molar ratio of thiol to (meth)acrylate functional groups (0.5:1) were used. As in Example 1, the two-component system additionally contained an organic peroxide and a promoter for the organic peroxide.

The following ingredients were employed, in the amounts shown in Table 2:
Monomer 1=tetrafunctional acrylate monomer, molecular weight 296 daltons
Oligomer 1=hexafunctional aliphatic polyester-based urethane acrylate oligomer, number average molecular weight 816.8 daltons
12% Cobalt Hex-Cem=cobalt bis(2-ethylhexanoate) (Borchers)
DMDO™=1,8-dimercapto-3,6-dioxaoctane (Arkema)
TegoStab® B 8484=silicone surfactant (Evonik)
Luperox® DDM-9=methyl ethyl ketone peroxide (Arkema)

Components A and B were separately prepared. Component B was then added by pouring into Component A and mixed by hand for 65 seconds. Immediately after this mixing step was completed, the Component A/Component B mixture reacted and expanded into a foamed product. The foam had a high density and medium hardness.

TABLE 2

| Component | Ingredient | mmol of Functionality | mmol | % on Resin | % on Total |
|---|---|---|---|---|---|
| A | Monomer 1 | 115 | 29 | 33.9 | 28.5 |
| A | Oligomer 1 | 63 | 10 | 33.9 | 28.5 |
| A | 12% Cobalt Hex-Cem ® | — | — | 1.0 | 0.8 |
| B | DMDO ™ | 89 | 45 | 32.2 | 27.1 |
| B | TegoStab ® B 8484 | — | — | 2.0 | 1.7 |
| B | Luperox ® DDM-9 | — | — | 1.0 | 0.8 |
| B | Cyclopentane | — | — | 15.0 | 12.6 |

Example 3

The following ingredients were employed, in the amounts shown in Table 3. The molar ratio of thiol to (meth)acrylate functional groups was 0.25:1.
SR351H=trimethylolpropane triacrylate, molecular weight 296 daltons (Sartomer)
12% Cobalt Hex-Cem=cobalt bis(2-ethylhexanoate) (Borchers)
DMDO™=1,8-dimercapto-3,6-dioxaoctane (Arkema)
TegoStab® B 8484=silicone surfactant (Evonik)
Luperox® CU-80=cumene hydroperoxide (Arkema)

Components A and B were separately prepared. Component B was then added by pouring into Component A and mixed by hand for 2 minutes. Three minutes after this mixing step was completed, the Component A/Component B mixture reacted and expanded into a foamed product. The high-hardness foam had a medium-low rise height.

TABLE 3

| Component | Ingredient | mmol of Functionality | mmol | % on Resin | % on Total |
|---|---|---|---|---|---|
| A | SR351H | 208 | 69 | 81.2 | 68.3 |
| A | 12% Cobalt Hex-Cem ® | — | — | 1.0 | 0.8 |
| B | DMDO ™ | 52 | 182 | 18.8 | 15.8 |
| B | TegoStab ® B 8484 | — | — | 2.0 | 1.7 |
| B | Luperox ® CU-80 | — | — | 1.0 | 0.8 |
| B | Cyclopentane | — | — | 15.0 | 12.6 |

Example 4

The following ingredients were employed, in the amounts shown in Table 4. The molar ratio of thiol to (meth)acrylate functional groups was 0.167:1.
SR238B=1,6-hexanediol diacrylate, molecular weight 226 daltons (Sartomer)
12% Cobalt Hex-Cem=cobalt bis(2-ethylhexanoate) (Borchers)
Thiocure® PETMP=pentaerythritol tetrakis(3-mercaptopropionate) (Bruno Bock)
TegoStab® B 8484=silicone surfactant (Evonik)
Luperox® DDM-9=methyl ethyl ketone peroxide (Arkema)

Components A and B were separately prepared. A small (2%) excess of Component B was used to compensate for the loss of material on the walls of the container in which Component B was prepared. Component B was then added by pouring into Component A and mixed by hand for 2 minutes. No foaming was observed during that time or during the following 24 hours.

TABLE 4

| Component | Ingredient | mmol of Functionality | mmol | % on Resin | % on Total |
|---|---|---|---|---|---|
| A | SR238B | 191 | 95 | 84.7 | 71.8 |
| A | 12% Cobalt Hex-Cem ® | — | — | 1.0 | 0.8 |
| B | Thiocure ® PETMP | 32 | 8 | 15.3 | 12.9 |
| B | TegoStab ® B 8484 | — | — | 1.0 | 0.8 |
| B | Luperox ® DDM-9 | — | — | 1.0 | 0.8 |
| B | Cyclopentane | — | — | 15.0 | 12.7 |

Example 5

The following ingredients were employed, in the amounts shown in Table 5. The molar ratio of thiol to (meth)acrylate functional groups was 0.25:1.
Monomer 2=long chain aliphatic diacrylate, molecular weight 310 daltons
12% Cobalt Hex-Cem=cobalt bis(2-ethylhexanoate) (Borchers)
Thiocure® PETMP=pentaerythritol tetrakis(3-mercaptopropionate) (Bruno Bock)
TegoStab® B 8484=silicone surfactant (Evonik)
Luperox® DDM-9=methyl ethyl ketone peroxide (Arkema)

Components A and B were separately prepared. Component B was then added by pouring into Component A and mixed by hand for 2 minutes. About 5 minutes later, the Component A/Component B mixture reacted and expanded into a hard, dense foam with low rise height.

TABLE 5

| Component | Ingredient | mmol of Functionality | mmol | % on Resin | % on Total |
|---|---|---|---|---|---|
| A | Monomer 2 | 136 | 68 | 83.6 | 70.2 |
| A | 12% Cobalt Hex-Cem ® | — | — | 1.0 | 0.8 |
| B | Thiocure ® PETMP | 34 | 8 | 16.4 | 13.8 |
| B | TegoStab ® B 8484 | — | — | 2.0 | 1.7 |
| B | Luperox ® DDM-9 | — | — | 1.0 | 0.8 |
| B | Cyclopentane | — | — | 15.0 | 12.6 |

Example 6

The following ingredients were employed, in the amounts shown in Table 6. The molar ratio of thiol to (meth)acrylate groups was 0.25:1.
SR349=ethoxylated bisphenol A diacrylate, molecular weight 468 daltons (Sartomer)
12% Cobalt Hex-Cem=cobalt bis(2-ethylhexanoate) (Borchers)
Thiocure® PETMP=pentaerythritol tetrakis(3-mercaptopropionate) (Bruno Bock)
TegoStab® B 8484=silicone surfactant (Evonik)
Luperox® DDM-9=methyl ethyl ketone peroxide (Arkema)
Components A and B were separately prepared. Component B was then added by pouring into Component A and mixed by hand for 40 seconds. After this mixing step was completed, the Component A/Component B mixture slowly reacted over about 30 seconds into a soft solid. In this example, no foam was produced.

TABLE 6

| Component | Ingredient | mmol of Functionality | mmol | % on Resin | % on Total |
|---|---|---|---|---|---|
| A | SR349 | 95 | 48 | 88.5 | 74.3 |
| A | 12% Cobalt Hex-Cem ® | — | — | 1.0 | 0.8 |
| B | Thiocure ® PETMP | 24 | 6 | 11.5 | 9.7 |
| B | TegoStab ® B 8484 | — | — | 2.0 | 1.7 |
| B | Luperox ® DDM-9 | — | — | 1.0 | 0.8 |
| B | Cyclopentane | — | — | 15.0 | 12.6 |

Example 7

The following ingredients were employed, in the amounts shown in Table 7. The molar ratio of thiol to (meth)acrylate groups was 0.25:1.
SR508=dipropylene glycol diacrylate, molecular weight 242 daltons (Sartomer)
12% Cobalt Hex-Cem=cobalt bis(2-ethylhexanoate) (Borchers)
Thiocure® PETMP=pentaerythritol tetrakis(3-mercaptopropionate) (Bruno Bock)
TegoStab® B 8484=silicone surfactant (Evonik)
Luperox® DDM-9=methyl ethyl ketone peroxide (Arkema)
Components A and B were separately prepared. Component B was then added by pouring into Component A and mixed by hand for 40 seconds. Immediately after this mixing step was completed, the Component A/Component B mixture reacted and expanded into a foamed product. The soft, flexible foam had a high rise height.

TABLE 7

| Component | Ingredient | mmol of Functionality | mmol | % on Resin | % on Total |
|---|---|---|---|---|---|
| A | SR508 | 166 | 83 | 79.9 | 67.1 |
| A | 12% Cobalt Hex-Cem ® | — | — | 1.0 | 0.8 |
| B | Thiocure ® PETMP | 42 | 10 | 20.2 | 16.9 |
| B | TegoStab ® B 8484 | — | — | 2.0 | 1.7 |
| B | Luperox ® DDM-9 | — | — | 1.0 | 0.8 |
| B | Cyclopentane | — | — | 15.0 | 12.6 |

Example 8

The following ingredients were employed, in the amounts shown in Table 8. The molar ratio of thiol to (meth)acrylate groups was 0.25:1.
SR272=triethylene glycol diacrylate, molecular weight 258 daltons (Sartomer)
12% Cobalt Hex-Cem=cobalt bis(2-ethylhexanoate) (Borchers)
Thiocure® PETMP=pentaerythritol tetrakis(3-mercaptopropionate) (Bruno Bock)
TegoStab® B 8484=silicone surfactant (Evonik)
Luperox® DDM-9=methyl ethyl ketone peroxide (Arkema)
Components A and B were separately prepared. Component B was then added by pouring into Component A and mixed by hand for 2 minutes. About 2 minutes after this mixing step was complete, the Component A/Component B mixture reacted and expanded into a hard, dense foam with low rise height.

TABLE 8

| Component | Ingredient | mmol of Functionality | mmol | % on Resin | % on Total |
|---|---|---|---|---|---|
| A | SR272 | 158 | 79 | 80.9 | 68.0 |
| A | 12% Cobalt Hex-Cem ® | — | — | 1.0 | 0.8 |
| B | Thiocure ® PETMP | 40 | 10 | 19.1 | 16.1 |
| B | TegoStab ® B 8484 | — | — | 2.0 | 1.7 |
| B | Luperox ® DDM-9 | — | — | 1.0 | 0.8 |
| B | Cyclopentane | — | — | 15.0 | 12.6 |

Example 9

The following ingredients were employed, in the amounts shown in Table 9. The molar ratio of thiol to (meth)acrylate groups was 0.25:1.
SR247=neopentyl glycol diacrylate, molecular weight 212 daltons (Sartomer)
12% Cobalt Hex-Cem=cobalt bis(2-ethylhexanoate) (Borchers)
Thiocure® PETMP=pentaerythritol tetrakis(3-mercaptopropionate) (Bruno Bock)
TegoStab® B 8484=silicone surfactant (Evonik)
Luperox® DDM-9=methyl ethyl ketone peroxide (Arkema)
Components A and B were separately prepared. Component B was then added by pouring into Component A and mixed by hand for 2 minutes. About 5-10 minutes later, the Component A/Component B mixture reacted and expanded into a hard, dense foam with low rise height.

TABLE 9

| Component | Ingredient | mmol of Functionality | mmol | % on Resin | % on Total |
|---|---|---|---|---|---|
| A | SR247 | 185 | 92 | 77.6 | 65.2 |
| A | 12% Cobalt Hex-Cem ® | — | — | 1.0 | 0.8 |

TABLE 9-continued

| Component | Ingredient | mmol of Functionality | mmol | % on Resin | % on Total |
|---|---|---|---|---|---|
| B | Thiocure ® PETMP | 46 | 12 | 22.4 | 18.8 |
| B | TegoStab ® B 8484 | — | — | 2.0 | 1.7 |
| B | Luperox ® DDM-9 | — | — | 1.0 | 0.8 |
| B | Cyclopentane | — | — | 15.0 | 12.6 |

What is claimed is:

1. A multi-component system for preparing a foamed product, comprising:
 a) a first component comprised of at least one acrylate compound having two or more acrylate functional groups per molecule; and
 b) a second component comprised of at least one thiol compound having two or more thiol functional groups per molecule;
 wherein at least one free radical initiator is present in at least one of the first component or the second component, at least one surfactant is present in at least one of the first component or the second component, and at least one blowing agent is present in at least one of the first component or the second component;
 wherein in the event the multi-component system has a molar ratio of thiol functional groups to acrylate functional groups of 0.5:1 or greater and the at least one free radical initiator includes at least one organic peroxide, the multi-component system additionally comprises at least one promoter for the at least one organic peroxide, wherein the at least one free radical initiator and the at least one promoter for the at least one free radical initiator are present in different components, and wherein the multi-component system comprises a total of from 50 to 85 weight percent acrylate compound(s) based on the total weight of the multi-component system.

2. The multi-component system of claim 1, wherein the multi-component system has a molar ratio of thiol functional groups to acrylate functional groups of 0.4:1 or less.

3. The multi-component system of claim 2, wherein the multi-component system comprises at least one promoter for the at least one free radical initiator and the at least one free radical initiator and the at least one promoter for the at least one free radical initiator are present in different components.

4. The multi-component system of claim 1, wherein the first component is comprised of at least one acrylate compound having two or more acrylate functional groups per molecule and a number average molecular weight of up to 1000 daltons.

5. The multi-component system of claim 1, wherein the first component is comprised of at least one acrylate compound selected from the group consisting of dipropylene glycol diacrylate and tricyclodecane dimethanol diacrylate.

6. The multi-component system of claim 1, wherein the second component is comprised of at least one thiol compound having two or more aliphatic thiol functional groups per molecule.

7. The multi-component system of claim 1, wherein the second component is comprised of at least one thiol compound having three or more aliphatic thiol functional groups per molecule.

8. The multi-component system of claim 1, wherein the second component is comprised of at least one thiol compound which is a 2-mercaptoacetate, 3-mercaptopropionate ester or 3-mercaptobuyrate ester of a polyalcohol containing two or more hydroxyl groups per molecule.

9. The multi-component system of claim 1, wherein the at least one free radical initiator includes at least one free radical initiator selected from the group consisting of azo compounds, organic peroxides, hydroperoxides, perketals, peresters, peroxydicarbonates, and peracids.

10. The multi-component system of claim 1, wherein the at least one surfactant includes at least one silicon-containing surfactant.

11. The multi-component system of claim 1, wherein the at least one blowing agent includes at least one physical blowing agent.

12. The multi-component system of claim 1, comprising a total of from 5 to 20 weight percent thiol compound based on the total weight of the multi-component system.

13. A multi-component system for preparing a foamed product, comprising:
 a) a first component comprised of at least one acrylate compound having two or more acrylate functional groups per molecule, at least one thiol compound having two or more thiol functional groups per molecule, at least one promoter, and at least one stabilizer; and
 b) a second component comprised of at least one free radical initiator;
 wherein the at least one promoter is a promoter for the at least one free radical initiator, at least one surfactant is present in at least one of the first component or the second component, and at least one blowing agent is present in at least one of the first component or the second component, and wherein the multi-component system comprises a total of from 50 to 85 weight percent acrylate compound(s) based on the total weight of the multi-component system.

14. The multi-component system of claim 13, wherein the multi-component system has a molar ratio of thiol functional groups to (meth)acrylate functional groups of 0.4:1 or less.

15. The multi-component system of claim 13, wherein the at least one promoter includes at least one promoter which is a salt or complex of a metal selected from the group consisting of Li, Al, Mg, Co, Fe, Cu, Zn, Ni, Mn, Cr, Sn, Au, Pd, V and Pt.

16. The multi-component system of claim 13, wherein the at least one stabilizer includes at least one stabilizer selected from the group consisting of phenolic compounds; phosphonic acid compounds; phosphite compounds; hydroquinones; hydroxylamine salts; organic acids; dialkyl polysulfides; and combinations thereof.

17. A method of making an article comprised of a foamed product, the method comprising combining the first component and the second component of the multi-component system of claim 1 to obtain a mixture and contacting the mixture with at least one substrate.

* * * * *